United States Patent
Singleton

[11] Patent Number: 6,004,457
[45] Date of Patent: *Dec. 21, 1999

[54] TEMPORARY SILT GUARD FOR SEWER INLET

[76] Inventor: Roger Singleton, 1060 Ellington Rd., Oxford, Ga. 30267

[*] Notice: This patent is subject to a terminal disclaimer.

[21] Appl. No.: 09/052,649

[22] Filed: Mar. 31, 1998

Related U.S. Application Data

[63] Continuation-in-part of application No. 08/834,446, Apr. 16, 1997, Pat. No. 5,843,306.

[51] Int. Cl.⁶ .................................................. B01D 35/02
[52] U.S. Cl. ........................ 210/163; 210/166; 210/170; 210/460; 405/41
[58] Field of Search ..................... 210/162, 163, 210/166, 170, 232, 460; 405/41, 48

[56] References Cited

U.S. PATENT DOCUMENTS

| | | | |
|---|---|---|---|
| 770,019 | 9/1904 | Neireiter . | |
| 1,310,055 | 7/1919 | Caldwell . | |
| 1,791,512 | 2/1931 | Schurman . | |
| 3,517,813 | 6/1970 | Thaler ...................................... | 210/166 |
| 3,713,539 | 1/1973 | Thompson et al. ...................... | 210/164 |
| 3,804,258 | 4/1974 | Okuniewski et al. ................... | 210/460 |
| 4,419,232 | 12/1983 | Arntyr et al. ............................ | 210/164 |
| 4,460,462 | 7/1984 | Arneson .................................. | 210/163 |
| 4,525,273 | 6/1985 | Logsdon .................................. | 210/164 |
| 4,658,449 | 4/1987 | Martin ........................................... | 4/496 |
| 4,935,132 | 6/1990 | Schaier .................................... | 210/163 |
| 5,089,108 | 2/1992 | Small ....................................... | 210/287 |
| 5,284,580 | 2/1994 | Shyh ........................................ | 210/163 |
| 5,297,895 | 3/1994 | Johnson ..................................... | 405/41 |
| 5,403,474 | 4/1995 | Emery ...................................... | 210/163 |
| 5,469,670 | 11/1995 | Thaler ......................................... | 52/12 |
| 5,480,254 | 1/1996 | Autry et al. ................................ | 404/2 |
| 5,486,287 | 1/1996 | Murphy et al. .......................... | 210/164 |
| 5,511,903 | 4/1996 | Nichols et al. ............................. | 405/43 |
| 5,526,613 | 6/1996 | Simeone, Jr. ................................ | 52/12 |
| 5,650,065 | 7/1997 | Sewell ..................................... | 210/166 |
| 5,720,579 | 2/1998 | Trangsrud ............................... | 405/244 |

*Primary Examiner*—David A. Simmons
*Assistant Examiner*—Betsey J. Morrison
*Attorney, Agent, or Firm*—Womble Carlyle Sandridge Rice

[57] ABSTRACT

A temporary silt guard for temporarily enclosing the open upper end of a drop inlet during the construction of a road system in commercial and residential developments is adapted to fit over and seat upon the open end of the drop inlet to enable runoff water to drain into the drop inlet while preventing silt and debris from being carried into and collected therein. The silt guard includes a body portion formed from a series of spaced slats defining radially spaced passages through the silt guard. A filter cover is received over the silt guard, formed from a silt screen material, with the slats of the body portion providing rigidity and strength to the filter cover. The filter cover filters out silt and debris while enabling storm water and runoff to drain into the drop inlet.

11 Claims, 4 Drawing Sheets

TEMPORARY SILT GUARD FOR SEWER INLET

CROSS REFERENCE TO RELATED APPLICATION

The present application is a continuation-in-part of U.S. patent application Ser. No. 08/834,446, filed Apr. 16, 1997, now U.S. Pat. No. 5,843,306, issued Dec. 1, 1998.

FIELD OF THE INVENTION

The present invention relates in general to devices for preventing silt and debris from collecting in storm water drainage pipes at construction sites, and in particular to a device that fits over and encloses the open end of a storm sewer drop inlet so as to trap and prevent silt and other debris from being washed into or being otherwise deposited within the inlet and thus the drainage pipes, while still enabling water to drain into the inlet.

BACKGROUND OF THE INVENTION

In the construction of new housing and other types of developments, the road system generally is first marked out and the streets into and through the development are cut and graded. Thereafter, the storm water drainage system for the development is constructed, which typically includes the underground drainage pipes, collection boxes and culverts, and drop inlets that form the manholes or drain openings along the street. The culverts are installed after the street bed has been graded to the elevation, whereupon the drop inlets are then installed and connected to the culverts and to the collection boxes. The drop inlets generally are substantially cylindrical concrete pipes that are installed vertically, with their lower ends connecting to the collection boxes and drainage pipes, and their upper ends being substantially at street level.

Once the grading of the street bed has been completed and the drainage system substantially installed, the drainage system then will be buried and the curbs for the street are graded and poured. Thereafter, throats are provided for the manholes, the throats being poured about the open ends of the drop inlets to form the curb inlets or drains and manholes along the sides of the streets through which storm water drains.

During the construction of roads and drainage systems, until the street has been substantially completed and the curbs and throats of the sewer system have been poured, the drainage pipes and inlets must be kept substantially free of dirt and debris pursuant to state and county building codes. Keeping dirt and debris out of the drainage system is, however, very difficult to accomplish as once the curbs are graded and the roads completed, during grading of the curbs as well as additional grading on site, dirt and debris is pushed to the sides of the street by the motor grader or bulldozer, and thus may pass into the open upper ends of the drop inlets. In addition, rain, runoff and wind also tend to wash or blow dirt and debris into the open ends of the drop inlets, which then collects in the collection boxes and sewer pipes.

If dirt and debris are washed into or otherwise collected within the collection boxes and/or other parts of the drainage system, it becomes necessary to send laborers down into the drop inlets and collection boxes to manually clean out the dirt and/or debris that has been washed or accidentally dropped into the drainage pipes to comply with building code regulations. Such cleaning operations are difficult as the pipes are somewhat cramped, making it difficult to maneuver, and there is also the danger of cave-ins or collapse of the dirt, etc. that has built up around the sides of the drop inlets, creating a significant risk of injury or even death to the laborers below. In addition, there can be as much as a ten to twelve-foot drop from the surface of the road, and the upper end of the drop inlet, to the bottom of the collection box on which the drop inlet is mounted. A fall from such a height can cause severe injuries to persons who might inadvertently fall into the inlet, especially as the open end of the inlet becomes obscured by dirt and other debris. The danger of an exposed, i.e. open, ten to twelve-foot drop inlet is especially great for children who might play around the area and are more likely to be curious and to inadvertently fall in and become trapped within the drainage pipes.

In the past, the open upper ends of the drop inlets generally have been protected with a simple silt fence constructed of a flexible mesh or screen material attached to a series of wooden stakes positioned about the open upper end of the drop inlet. Such an arrangement is illustrated in FIG. 1, which shows in general the known method of enclosing and marking the open end of a drop inlet at construction sites. Such arrangements, however, have not proven satisfactory for preventing dirt and debris from falling into the open end of the drop inlet, and they provide little or no protection against persons inadvertently falling into an open drop inlet, and especially for keeping children out of the inlet.

In fact, as shown in FIG. 2, the known silt fences typically tend to collapse, or be blown down, or washed down over a short period of time. This is due to the fact that the mesh of the silt fence and the stakes holding the silt fence in place are not strong enough to withstand heavy rains and wind, and even less so the force of dirt and debris being pushed against the silt fence by a motor grader or bulldozer as the streets and curbs of the site are graded. Under such weight, as illustrated in FIG. 2, the silt fence generally will collapse, often falling into the open end of the drop inlet itself thus permitting the accumulated dirt and debris being urged or pushed thereagainst to fall into the drop inlet.

Although the simplest solution to this problem would seem to be to completely seal the open end of the drop inlet, this is not feasible in that rain and storm runoff water must be permitted to drain through the storm water drainage system of the development during construction to permit the ground to dry, and to prevent storm water from eroding the work site and carrying soil and debris to adjacent lots or buildings. Also, the construction site must be kept as dry as possible in order to enable the curbs and throats to be poured and the streets to be finished, which cannot otherwise be accomplished if the ground is too wet to support the concrete as it is poured and formed, thus necessitating a good, open drainage system for the site.

Accordingly, it can be seen that a need exists for a device to cover and protect the open upper end of a drop inlet for a storm water drainage system at new construction developments which will prevent silt, dirt and debris from being washed or blown into the inlet, and will also prevent access to the inlet to minimize the risk of accidents due to persons falling or climbing into the open inlet, but which still allows for the free and substantially complete drainage of storm runoff water into the drainage system at the development site.

SUMMARY OF THE INVENTION

Briefly described, the present invention comprises a temporary and substantially rigid silt guard and cover for a drop inlet used in a storm water drainage system. The present invention generally is designed for use at construction sites for enclosing the open upper end of a drop inlet of the storm drainage water system of the development during the construction of the streets, curbs, and the construction of the drainage system itself. The silt guard generally is substantially cylindrically shaped, is approximately two to three feet in height, and is formed from a rigid, durable plastic material, and is sized and shaped to fit over and seat upon the upper ends of most conventional drop inlets.

The silt guard typically includes a substantially cylindrical or tubular body portion having an upper end and a lower end. A circular bottom rim is formed about the lower end of the body, slightly overlapping the sides of the body. The bottom rim is approximately 48 to 60 inches in diameter, defining a lower opening in the silt guard, and is adapted to fit over and seat upon the open upper end of a drop inlet. The body portion further includes a series of spaced, vertically extending slats or ribs that extend from the bottom rim and taper inwardly toward the upper end of the body. The slats are spaced from one another to define a series of radially spaced openings or passages therebetween to enable the flow of water into and through the silt guard while blocking passage of large debris and silt.

The silt guard further includes a top portion that extends upwardly from the body and generally has a substantially smaller diameter than the upper end of the body. The top portion generally is substantially curved or dome shaped and extends vertically and tapers toward the upper end of the body. A series of radially spaced slots or openings also can be formed in the top portion of the silt guard to provide extra pathways for storm runoff water to drain into the inlet.

In use, a filter cover or cap formed from a silt screen or mesh material is fitted over and covers the silt guard. The cover generally will be sized and shaped to conform to the shape of the silt guard, having a domed top portion that fits over the top portion of the silt guard and a skirt portion that covers the slats of the body portion and overlaps the bottom rim of the silt guard. The silt screen material of the top portion of the filter cap also can be painted or dyed a fluorescent color to make it easier to detect, to warn of or signal the location of the drop inlet.

Alternatively, workers can wrap the body portion of the silt guard with a silt screen or mesh material typically having a width of at least two to three feet in place of the filter cap or cover. The silt screen material is secured to the upper end of the body portion by fasteners, such as screws, or on hooks or similar fastening devices mounted to the upper end of the body. The lower end of the silt screen material is left overlapping the bottom rim of the silt guard by approximately 6 inches and thus overlaps the open upper end of the drop inlet on which the silt guard is mounted.

As dirt is urged against the silt guard, the weight of the dirt helps hold the silt guard on the inlet and hold the silt screen material of the filter cap against the silt guard. The slats or ribs of the body portion provide strength and rigidity to the silt screen material as dirt and debris are pushed thereagainst so as to prevent the collapse of the silt screen material, and thus the passage of the dirt and debris into the drop inlet. The silt screen material enables rain and runoff water to pass therethrough and through the openings or passages formed between the slats to enable rainwater, etc. to drain into the drainage system while blocking the passage of silt and debris therethrough.

Once the curbs have been graded and are being poured, workers will dig out the excess dirt from around the silt guard and drop inlet, and the silt guard can be lifted upward and off of the drop inlet to enable the throat to be poured around the drop inlet to finish the drain or manhole. The used silt screen material then simply is stripped off of the silt guard, and the silt guard cleaned of excess dirt and debris leaving it ready for its next use.

Various objects, features and advantages of the present invention will become apparent to those skilled in the art upon reading the following detailed description, when taken in conjunction with the accompanying drawings.

DETAILED DESCRIPTION

Figure 1:
FIG. 1 is a perspective view of a known silt fence arrangement for enclosing an open drop inlet.
Figure 2:
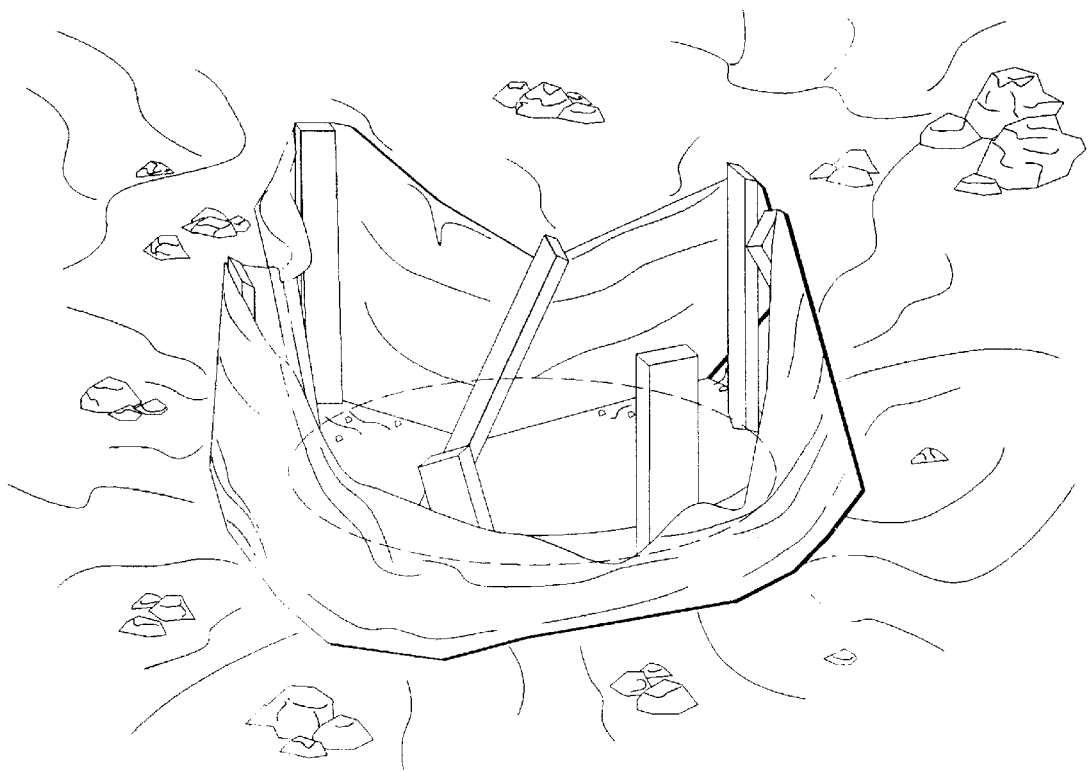
FIG. 2 is a perspective view of a known silt fence arrangement for enclosing an open drop inlet, illustrating the tendency of such an arrangement to collapse as dirt and debris collects thereagainst.
Figure 3:
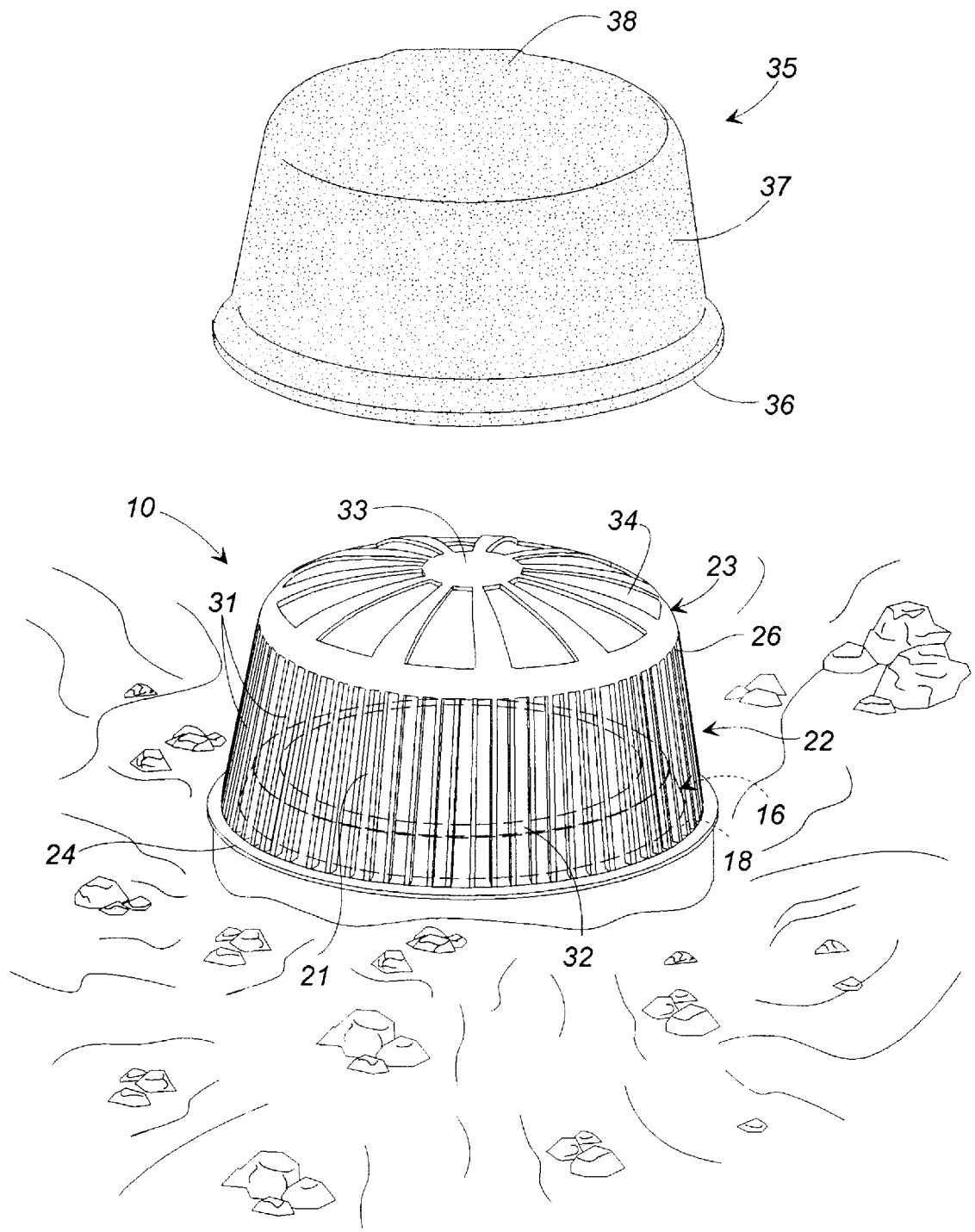
FIG. 3 is a perspective view illustrating the mounting of the silt guard with its cover of silt screen or filter material of the present invention over the open upper end of a drop inlet for a sewer or drainage system.

Referring now to the drawings in which like reference numerals indicate like parts throughout the several views, FIG. 3 illustrates the temporary silt guard 10 of the present invention mounted over a drop inlet 11 of a storm water drainage system 12. The silt guard 10 generally is designed for temporarily covering and protecting an open drop inlet during the grading and construction of the road system for, as well as during additional site grading of, new residential or commercial construction development sites, and as the roads and curbs thereof are graded and poured, in order to prevent silt and debris from collecting within the underground pipes 13 of the drainage system. Typically, the storm water drainage system will include underground concrete or metal drainage pipes 13, and/or collection boxes (not illustrated), with drop inlets 11 mounted thereto as illustrated generally in FIGS. 3 and 5.

The drop inlets 11 of the drainage system 12 typically are hollow, substantially cylindrical pipes made from concrete and are mounted vertically with an open lower end 14 connected to one of the drainage pipes 13 of the system, with an open upper end 16 generally left approximately at or above ground level. The upper end 16 of the drop inlet generally includes an inwardly tapering upper portion 17 that defines an upper opening through which water is permitted to drain into the drainage system, and an upper rim 18 encircling the tapered upper portion 17. After the throats and curbs of the street are poured, the open upper ends of the drop inlets typically form the manholes or curb drains for the street.

Figure 4:
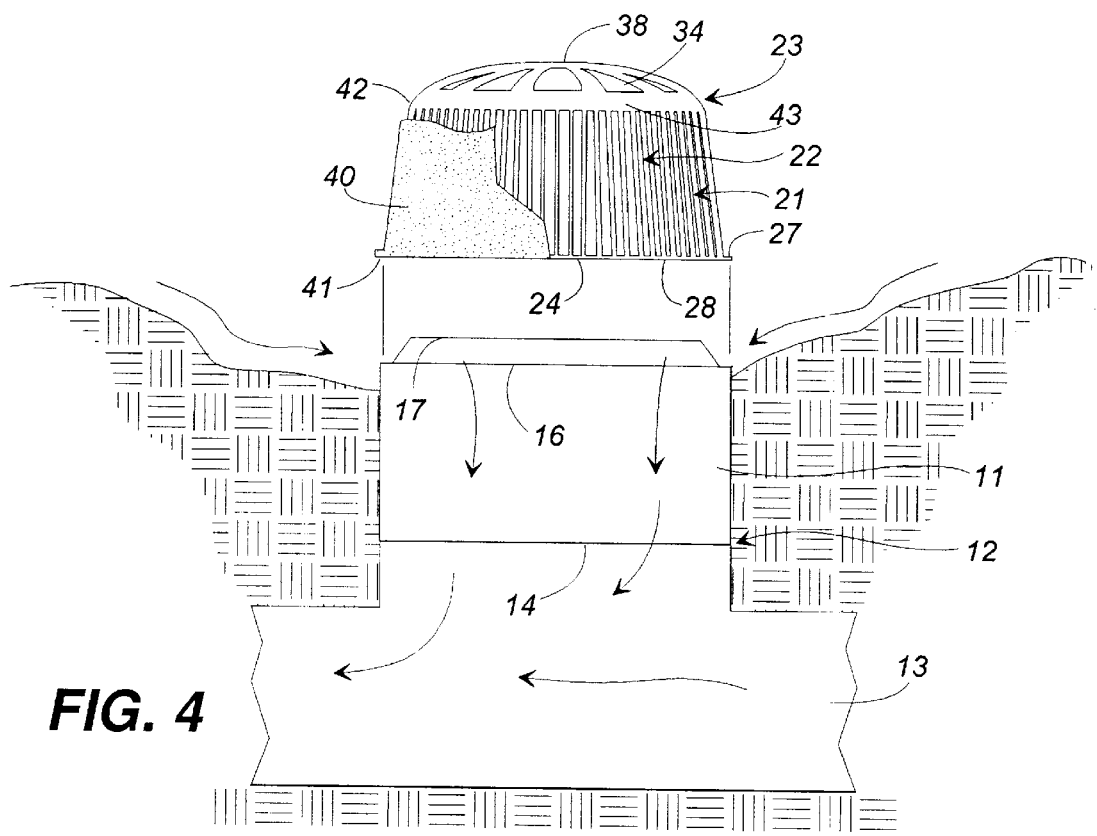
FIG. 4 is a side elevational view of the silt guard mounted on top of a drop inlet showing the filter material wrapped thereabout.
Figure 5:
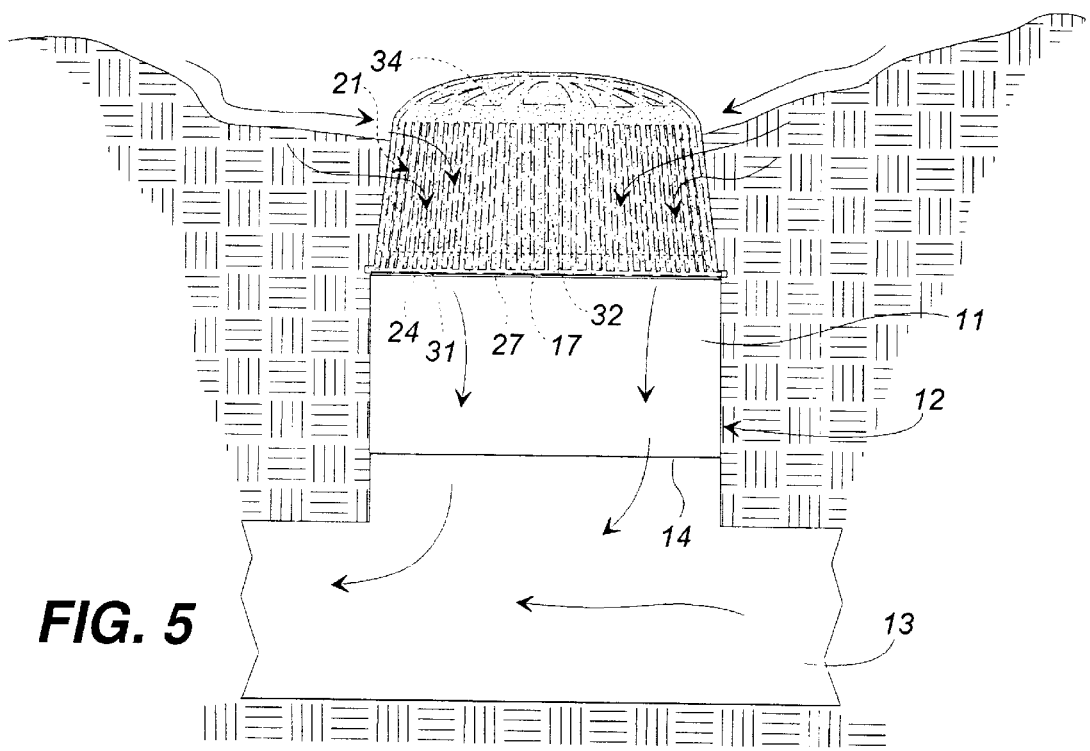
FIG. 5 is a side elevational view of the silt guard of the present invention mounted on a drop inlet and illustrating the flow of water therethrough while dirt and debris are piled up thereagainst.

To temporarily enclose and prevent inadvertent or unauthorized entry into the open drop inlets during construction, while still enabling storm runoff water to drain into the drainage system, the temporary silt guard 10 of the present invention is mounted over the open upper end of the inlet as illustrated in FIGS. 3–5. The silt guard 10 generally is substantially cylindrical in fashion similar to the drop inlet 11 on which it is mounted, and is approximately two to three feet in height. The silt guard thus extends well above the open upper end 17 of the drop inlet 11 to provide a visual indication or marker of the location of the drop inlet. As shown in FIG. 3, the silt guard is sized and shaped to fit over and seat upon the upper rim 18 of most conventional drop inlets 11, and typically is constructed from a rigid, durable plastic material such as polyvinylchloride (PVC), acyrilonitrile-butadinene-styrene (ABS) or acetyl resin such as "DELRIN", or any other similar rigid, durable, high strength materials, including metals such as aluminum, that are relatively lightweight for ease of handling. The silt guard further defines an internal passage 21 (FIG. 4) therethrough in which storm runoff water is permitted to pass and drain into the drop inlet, and thus into the drainage system of the development.

As shown in FIG. 3, the silt guard 10 generally includes a lower or body portion 22 with a top portion 23, typically formed as a part of the body portion, extending upwardly from body portion 22. The body portion 22 of the silt guard 10 generally is approximately 18 to 28 inches in height, with an open lower or first end 24 and an upper or second end 26. As FIG. 3 indicates, the body portion is substantially tubular or cylindrical and is tapered or inclined from lower end 24 toward upper end 26 in order to enable additional silt guards to be stacked thereon for ease of storage and transport.

A flat, substantially circular bottom rim 27 is formed about the lower end of the body portion. Bottom rim 27 generally has a thickness of approximately ½ to 1 inch with an outer diameter of approximately 48 to 60 inches, and defines a lower opening or passage 28 having an internal diameter of approximately 46 to 47 inches. The bottom rim projects radially outwardly from the bottom most portion of the body portion of the silt guard by approximately 1 to 2 inches, and is adapted to fit over and seat upon the upper rim 18 of the drop inlet 11. This ensures that the silt guard will be securely positioned over the open upper end 16 of the drop inlet with the open upper end of the drop inlet extending into the open lower end 24 of the silt guard to prevent the silt guard from sliding or otherwise being easily dislodged from the upper end of the drop inlet.

The body portion 22 generally includes a spaced series of elongate slats or ribs 31 defined within the body portion 22, extending between the upper and lower ends 24 and 26 of the body portion. It is anticipated that slats 31 will be approximately ½ to 2 inches in width, and define radially spaced openings or passages 32 of approximately 1 to 2 inch widths therebetween. The passages 32 enable water to drain through the body portion and into the internal passage 21 of the silt guard, as illustrated in FIG. 5. It also will be understood that the dimensions of slats 31, and of openings/passages 32 may be varied in accordance with the needs of the users of the silt guard to provide larger or smaller passages. As shown in FIGS. 3 and 5, the slats 31 slant inwardly toward the upper end 24 of the body portion from the lower end 24 so as to provide the filter box with a tapered construction for ease of stacking multiple silt guards one on top of another.

As illustrated in FIGS. 3–5, the top portion 23 of the silt guard 10 is formed over and extends upwardly from the upper end 26 of the body portion 22, and has a reduced diameter compared to the diameter of upper end 26 of the body portion. The top portion generally is slightly curved or domed, forming a curved or domed top end 33, although it can be flat if so desired, and is approximately 6 to 10 inches high and approximately 40 to 48 inches in diameter. The top portion covers or encloses the body portion of the silt guard and also can be reinforced to support added weight. As a result, access into the drop inlet 11 is generally barred or blocked to substantially minimize the risk of inadvertent or unauthorized access into the drop inlet.

A series of radially spaced slots 34 or upper openings are formed in the top portion 23. The slots are elongated, substantially rectangularly shaped openings that extend at least partially across the top portion and provide additional passageways for overflow storm runoff into the drop inlet, when and as needed. In addition, the slots also enable a pipe or bar to be inserted therethrough to provide a means by which the silt guard can be lifted upwardly off of the drop inlet after use, i.e., after project completion.

As illustrated in FIGS. 3 and 5, a filter cover or cap 35 is received over the silt guard 10, generally covering the silt guard. The filter cap 35 is formed from porous filtering material, typically a conventional silt screen material of the type known to those of skill in the art, but can also include a plastic, nylon, or wire mesh, or other similar filtering material or fabric. The filter cap is formed as a substantially cylindrical sheet or cover and is sized and shaped to fit over the silt guard with its lower edge 36 overlapping the bottom rim 27 of the body portion 22. Typically, the filter cap will be cut or formed from sheets of silt screen material sewn together to form a skirt or body portion 37 and a top portion 38, or otherwise attached in a configuration similar to that of the silt guard so as to substantially match the profile of the silt guard. It also would be possible to form the filter cap from a single sheet of silt screen material sized and shaped to cover the silt guard.

The top portion 38 of the filter cap rests and is supported on the top portion of the silt guard, with the silt screen material of the skirt or body portion 37 covering and being laterally supported by the slats 31 of the body portion 22 of the silt guard. As shown in FIG. 5, the lower edge 36 of the silt screen material of the cover 35 is left overlapping the bottom rim 27 of the silt guard by approximately 3 to 6 inches or more. Accordingly, once the silt guard is installed over the upper end 16 (FIG. 3) of a drop inlet 11, the upper end of the drop inlet is likewise overlapped by the lower edge 36 of the filter cap as shown in FIG. 5. The filter cap is held in place initially by dirt placed thereagainst by workers during the installation of the silt guard and further by the silt and debris washed thereagainst and which the filter cap prevents from flowing into the drop inlet with the runoff or storm water passing through the silt guard.

In an alternate embodiment illustrated in FIG. 4, it is also possible to use a sheet or roll of conventional silt screen material as indicated at 40 that is wrapped about the slats 31 of the body portion 22, typically where workers in the field, instead of using the pre-formed filter cap or cover 35 illustrated in FIGS. 3 and 5. The silt screen material typically is rolled or wrapped about the body portion of the silt guard 10, as shown in FIG. 4, with its lower edge 41 overlapping the bottom rim 27 of the body portion approximately 3 to 6 inches. The upper edge of the silt screen material 40 typically will be secured to the top portion 23 of the silt guard by a series of fasteners 43 such as screws or hooks, or other types of fastening devices including adhesives and metal bands or ties to secure the upper edge of the silt screen material to the silt guard.

In addition, the top portion 37 of the filter cap 35 (FIGS. 3 and 5) can also be dyed or painted with a fluorescent color, such as a bright orange or red, either at its center or in its entirety. This will make the filter cap and thus the silt guard itself stand out more prominently and provide a clear and easy to recognize visual indicator of the existence and position of the drop inlet for workers. If the filter cap is replaced with the application of a sheet of silt screen material about the body portion only, the domed top portion of the silt guard itself can be painted a fluorescent color to make it more recognizable and identifiable.

Figure 6:
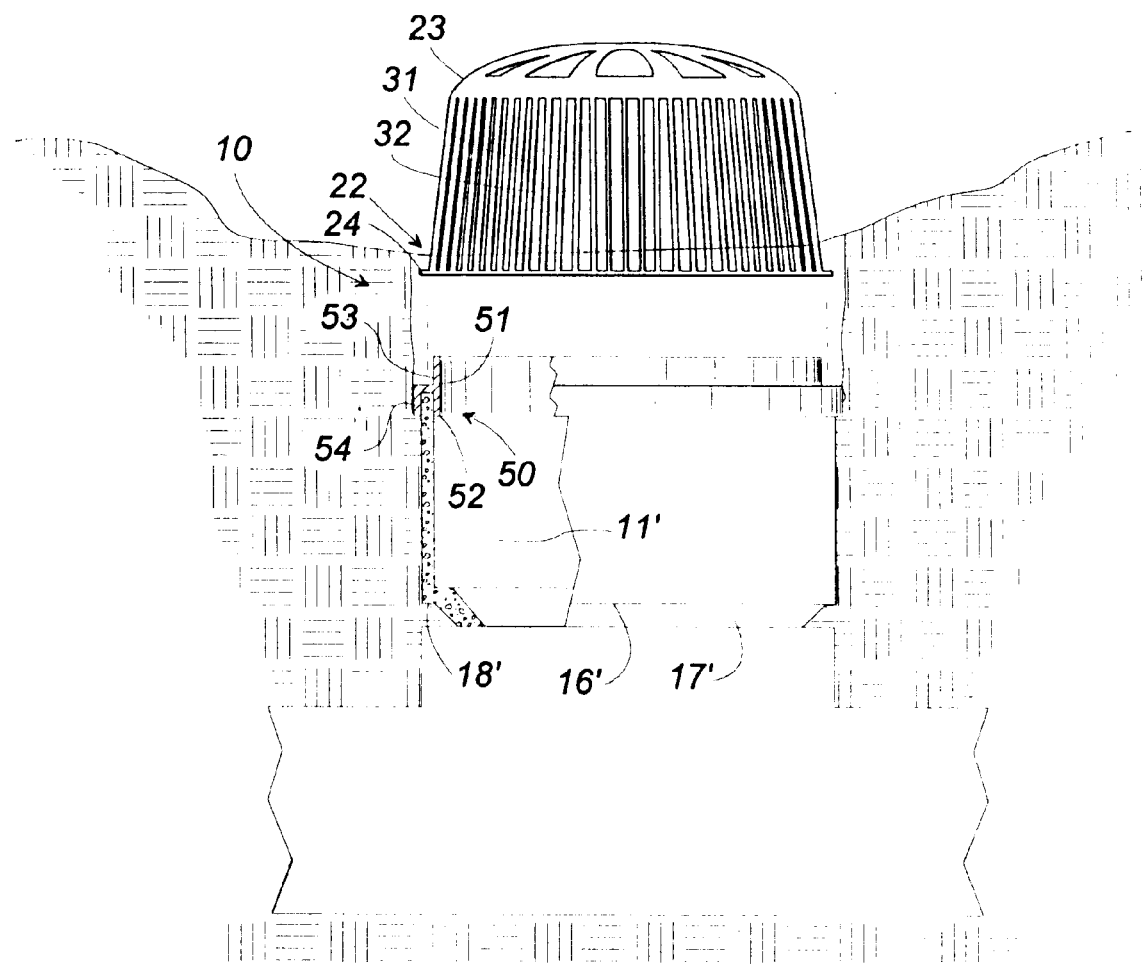
FIG. 6 is a side elevational view taken in partial cross-section of the silt guard with a mounting bracket for mounting the silt guard on an inverted drop inlet.

Alternatively, there are times when the storm water drop inlet 11' is installed in an inverted condition, as illustrated in FIG. 6. As a result, the flat, bottom or female edge 14' of the drop inlet is left facing upwardly, with the tapered upper portion 17' and rim 18' of the drop inlet facing downwardly. Under such circumstances, a bracket 50 is mounted on the upwardly facing bottom edge 14' of the drop inlet to provide a seating mechanism for mounting the silt guard 10 on the drop inlet 11'. As FIG. 6 illustrates, the bracket 50 has a generally H-shaped cross-section and is of the same approximately diameter and size as conventional drop inlets. The bracket includes a first or inside leg 51 that has a lower portion 52 that projects into and typically engages the inner side wall of the drop inlet and an upper portion 53 extending above the flat bottom edge 14' of the drop inlet. A second or outside leg 54 extends over the bottom edge, projecting outwardly from the inside leg so that the bracket can engage and be seated upon the upwardly facing bottom edge 14" of the drop inlet.

With the bracket 50 thus positioned on the drop inlet, the silt guard is seated on the bracket with the upper portion 53 of inside leg 51 projecting into the silt guard adjacent the inner side surfaces of the slots 31. The bottom rim of the silt guard is seated on the outside leg to thus provide a stable, secure mounting of the silt guard on an inverted drop inlet, is indicated in FIG. 6.

In use, as illustrated in FIGS. 3 and 5, once the underground pipes 13 of the drainage system 12 have been laid, and the drop inlets 11 have been connected thereto, temporary silt guards 10 of the present invention will be placed one apiece atop the upper end 16 of each drop inlet 11 forming a part of the storm water drainage system. Once the silt guard is in position, the filter cap 35 will be placed thereover. If a sheet of silt screen material 40 (FIG. 4) is used in place of the cap 35 (FIGS. 3 and 5), it is anticipated that silt screen material generally will have been first secured about the body portion 22 of the silt guard 10 prior to the installation of the silt guard atop the open upper end of a drop inlet, although it is possible to first mount the silt guard on the drop inlet and to then install the silt screen material about body portion.

The silt guard is installed over the open upper end of the drop inlet with bottom rim 27 of the silt guard seated on the upper rim 18 of the drop inlet, and with the upper portion 17 of the drop inlet projecting upwardly within and being received in lower opening 28 of the silt guard. This provides a stable, substantially secure mounting of the silt guard on the open upper end of the drop inlet and minimizes the possibility that the silt guard may be dislodged or blown off of the drop inlet. Once installed with the filter cap covering the silt guard, workers will place dirt about the periphery of the silt guard, covering the overlapping lower edge of the filter cap to hold the filter cap on the silt guard and to help hold the silt guard itself in position on the drop inlet.

Thereafter, as the grading of the sites and roadbeds is completed, and the curbs for the streets are then graded, the dirt and debris which typically is pushed up against the silt guard by the motor graders or bulldozers will be held out of drop inlet 11 and pipe 13 as shown in FIG. 5. The silt screen material of the filter cap thus is further held against the slats of the filter box by the silt and debris it filters from the runoff water while it permits the runoff water to pass therethrough and to drain into the drop inlet, preventing the silt and debris from passing into the drop inlet. The slats or ribs of the silt guard provide the strength and rigidity needed to support the silt screen material of the filter cap skirt portion against the weight of the accumulated dirt and debris pushed thereagainst, which thus prevents the probable collapse of the silt screen material as now occurs in the art. At the same time, however, the added weight of the dirt piled against the silt guard serves to further secure and hold the filter cap against the silt guard and the silt guard against the open upper end of the drop inlet to prevent the silt guard from being dislodged by wind and rain. Thus, the drop inlet is kept substantially free of dirt and debris during the grading of the site, as well as of the project curbs and streets, while rain and runoff water is permitted to pass through the silt screen of the silt guard and into the drop inlet where the runoff water can drain through the drainage system.

Once the curbs have been graded, any excess dirt around the silt guard and upper end of the inlet will be dug out as part of the process for forming and pouring the throats and manholes about the upper ends of the drop inlets. With the excess dirt removed from about the drop inlets the used silt screen filter cap generally is peeled or otherwise stripped off of the silt guard and disposed of, if it cannot be cleaned and reused. The silt guard 10 itself is lifted off of the drop inlet and hosed or washed down to clean excess dirt and debris therefrom, leaving the silt guard ready for its next use. In some instances where it is difficult to clear away enough debris to easily remove the silt guard, a pipe (not illustrated) or similar bar generally can be inserted through opposing ones of the slots 34 defined within the top portion 23 of the silt guard.

Accordingly, it can be seen that the present invention provides a unique, temporary silt guard for enclosing the open upper end of a drop inlet that can withstand the substantial weight and the accompanying force of dirt and debris urged or collected thereagainst to prevent this dirt and debris from collecting within the drop inlet, as well as restrict unauthorized or accidental access to the open upper end of the drop inlet while still enabling storm runoff water to be drained from the site without clogging the drainage system or adjacent streams or lots with eroded soil and construction debris. As a result, the necessity of sending personnel down into the drainage system to clean out collected dirt and debris therefrom so as to comply with state and county code regulations is substantially minimized. In addition, the light weight construction and design of the silt guard of the present invention enables several silt guards to be stacked one on top of another for ease of transport and storage.

It will be understood by those skilled in the art that while the present invention has been described in terms of a preferred embodiment thereof, numerous modifications, additions and changes can be made thereto without departing from the spirit and scope of the invention as set forth in the following claims.

I claim:

1. A temporary silt guard for enclosing an open end of a drop inlet, said silt guard comprising:

a body having an open lower end seated upon the open end of the inlet, a spaced upper end, and a series of ribs extending between said upper and lower ends and defining passages therebetween;

a top portion extending upwardly from said body and tapering inwardly for enclosing and restricting access to the open end of the drop inlet, said top portion having an upper end defining an inlet opening; and a porous filter cover received over and supported by said top portion and overlapping said body for filtering silt and debris from water passing therethrough and into the drop inlet to prevent silt and debris from flowing into the drop inlet.

2. The temporary silt guard of claim 1 and wherein said filter cover is formed from a silt screen material.

3. The temporary silt guard of claim 1 and wherein said body tapers from said lower end toward said upper end to enable stacking of additional silt guard thereon.

4. The temporary silt guard of claim 1 and wherein said top portion includes a series of spaced slots.

5. A silt guard for preventing silt and debris from entering an upstanding drop inlet, the drop inlet having an open upper end with a tapered upper portion surrounded by an upper rim, said silt guard comprising:

an elongate tubular member formed about a longitudinal axis, said tubular member having a first end and a spaced second end;

a radially spaced series of openings defined in said tubular member intermediate said first end and said second end;

a filter cap formed from a filtering material and sized and shaped to fit over said tubular member, covering each of said spaced series of openings defined in said tubular member for filtering silt and debris from a flow of water passing therethrough and draining into the drop inlet.

6. The silt guard of claim 5, further comprising a bottom rim formed at the first end of said tubular member for being received on the open upper end of the drop inlet.

7. The silt guard of claim 6, wherein said bottom rim comprises a flange for being seated on the upper rim of the drop inlet.

8. The silt guard of claim 5, further comprising an elongate top portion formed at the second end of said tubular member, said top portion having a radially spaced series of openings defined therein.

9. The silt guard of claim 5, wherein said tubular member includes radially spaced series of elongate slats extending from said first end of said tubular member to said second end thereof about said axis, said slats defining said radially spaced series of openings in said tubular member therebetween.

10. A silt guard for use with an upstanding drop inlet, the drop inlet having an open upper end with a tapered upper portion surrounded by an upper rim, said silt guard comprising:

an elongate tubular body portion having an exterior periphery, a first end and a spaced second end and including a series of spaced slats extending between said first and second ends, defining a radially spaced series of openings through said body portion;

a bottom rim at the first end of said body portion for being received on the upper rim of the drop inlet;

an elongate top portion formed at the second end of said body portion, said top portion extending from the second end of said body portion and being tapered inwardly; and a filter cover fitted over said exterior periphery of said body portion and overlap said bottom rim, each of said spaced series of openings for filtering silt and debris from a flow of fluid passing therethrough and into the drop inlet.

11. The silt guard of claim 10, wherein said filter cover is draped over and supported by said top portion and body portion and overlies said bottom rim for extending about and over at least a portion of the open upper end of the drop inlet.

* * * * *